(12) United States Patent
Abbe et al.

(10) Patent No.: US 11,551,397 B1
(45) Date of Patent: Jan. 10, 2023

(54) MEDIA ANIMATION SELECTION USING A GRAPH

(71) Applicant: GoPro, Inc., San Mateo, CA (US)

(72) Inventors: Guillaume Abbe, Paris (FR); Guillaume Oulès, Bordeaux (FR); David Sherpa, Paris (FR)

(73) Assignee: GoPro, Inc., San Mateo, CA (US)

( * ) Notice: Subject to any disclaimer, the term of this patent is extended or adjusted under 35 U.S.C. 154(b) by 70 days.

(21) Appl. No.: 17/332,920

(22) Filed: May 27, 2021

(51) Int. Cl.
*G06T 13/80* (2011.01)
*G06T 11/00* (2006.01)

(52) U.S. Cl.
CPC ............ *G06T 13/80* (2013.01); *G06T 11/001* (2013.01); *G06T 2207/10016* (2013.01); *G06T 2213/12* (2013.01)

(58) Field of Classification Search
CPC .................. G06T 11/001; G06T 13/80; G06T 2207/10016; G06T 2213/12; G11B 27/028; G11B 27/034; H04N 21/854
See application file for complete search history.

(56) References Cited

U.S. PATENT DOCUMENTS

| | | | | |
|---|---|---|---|---|
| 5,682,326 A | * | 10/1997 | Klingler | G11B 27/34 715/202 |
| 6,469,723 B1 | * | 10/2002 | Gould | G06T 1/00 715/845 |
| 6,501,476 B1 | * | 12/2002 | Gould | G06T 15/00 345/473 |
| 2001/0020953 A1 | * | 9/2001 | Moriwake | G11B 27/034 348/E5.051 |
| 2003/0033424 A1 | * | 2/2003 | Gould | G06T 1/20 709/233 |
| 2008/0016491 A1 | * | 1/2008 | Doepke | G06T 17/005 717/104 |
| 2013/0063472 A1 | * | 3/2013 | Marison | G06T 15/005 345/591 |
| 2013/0071031 A1 | * | 3/2013 | Huang | G06V 10/40 382/190 |
| 2021/0264952 A1 | * | 8/2021 | Zhu | G11B 27/034 |
| 2021/0311619 A1 | * | 10/2021 | Winnemoeller | G06F 3/04845 |

\* cited by examiner

*Primary Examiner* — King Y Poon
*Assistant Examiner* — Vincent Peren
(74) *Attorney, Agent, or Firm* — Esplin & Associates, PC (57) ABSTRACT

A media sequence includes media items arranged in a sequence. A graph is generated to represent animations available for the media items in the media sequence. The graph includes nodes that represent the available animations. The animations to be used in generating the media sequence is selected via selection of a path through the graph, and the media sequence is generated using the selected animations.

20 Claims, 10 Drawing Sheets

| V. Anim. A 402 | Default 404 |

| V. Anim. A 406 | Default 408 |

| V. Anim. A 410 | Default 412 |

| V. Anim. A 414 | Default 416 |

| I. Anim. A 418 | I. Anim. B 420 | Default 422 |

| V. Anim. A 424 | Default 426 |

MEDIA ANIMATION SELECTION USING A GRAPH

FIELD

This disclosure relates to selection of animations for media items using a graph.

BACKGROUND

A use may wish to apply animations to one or more media items included in a media sequence. Manually selecting animations to be applied to media items may be difficult and time consuming. Randomly choosing animations for the media items may result in undesirable combination of animations in the media sequence.

SUMMARY

This disclosure relates to selection of media animations. Identification of a sequence of media items included in a media sequence may be obtained. Animations that are available for individual ones of the media items included in the media sequence may be determined. A graph of the animations that are available for the individual ones of the media items included in the media sequence may be generated. The graph may include a node for individual ones of the animations that are available for the individual ones of the media items included in the media sequence. Animations to be used for the media sequence may be selected via selection of a path through the graph. The media sequence may be generated using the selected animations.

A system that selects media animations may include one or more electronic storage, processor, and/or other components. The electronic storage may store information relating to media items, information relating to sequences of media items, information relating to animations, information relating to availability of animations, information relating to graphs, and/or other information.

The processor(s) may be configured by machine-readable instructions. Executing the machine-readable instructions may cause the processor(s) to facilitate selecting media animations. The machine-readable instructions may include one or more computer program components. The computer program components may include one or more of a media sequence component, an animation component, a graph component, a selection component, a generation component, and/or other computer program components.

The media sequence component may be configured to obtain identification of a sequence of media items included in a media sequence. In some implementations, the sequence of media items may include one or more images, one or more videos, and/or other media items.

The animation component may be configured to determine animations that are available for individual ones of the media items included in the media sequence. In some implementations, the animations that are available for the individual ones of the media items included in the media sequence may be determined based on a type of the individual ones of the media items and/or other information. In some implementations, a first set of animations may be available for an image, and a second set of animations may be available for a video. The first set of animations may be different from the second set animations.

The graph component may be configured to generate a graph of the animations that are available for the individual ones of the media items included in the media sequence. The graph may include a node for individual ones of the animations that are available for the individual ones of the media items included in the media sequence. In some implementations, the graph of the animations that are available for the individual ones of the media items included in the media sequence may be generated based on a set of constraints and/or other information.

In some implementations, the set of constraints may include a media compatibility constraint. The media compatibility constraint may determine whether a given animation is compatible with a given media item based on one or more characteristics of the given media item and/or other information.

In some implementations, the set of constraints may include a succession constraint. The succession constraint may define one or more forbidden sequences of animations.

In some implementations, the set of constraints may include a repetition constraint. The repetition constraint may define a maximum number of times a given animation is allowed to repeat.

In some implementations, the set of constraints may include a distance constraint. The distance constraint may define a minimum distance between repetitions of a given animation.

In some implementations, the set of constraints may include a target number constraint. The target number constraint may define a target number of times a given animation is to be repeated.

The selection component may be configured to select animations to be used for the media sequence. The animations to be used for the media sequence may be selected via selection of a path through the graph.

The generation component may be configured to generate the media sequence. The media sequence may be generated using the selected animations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
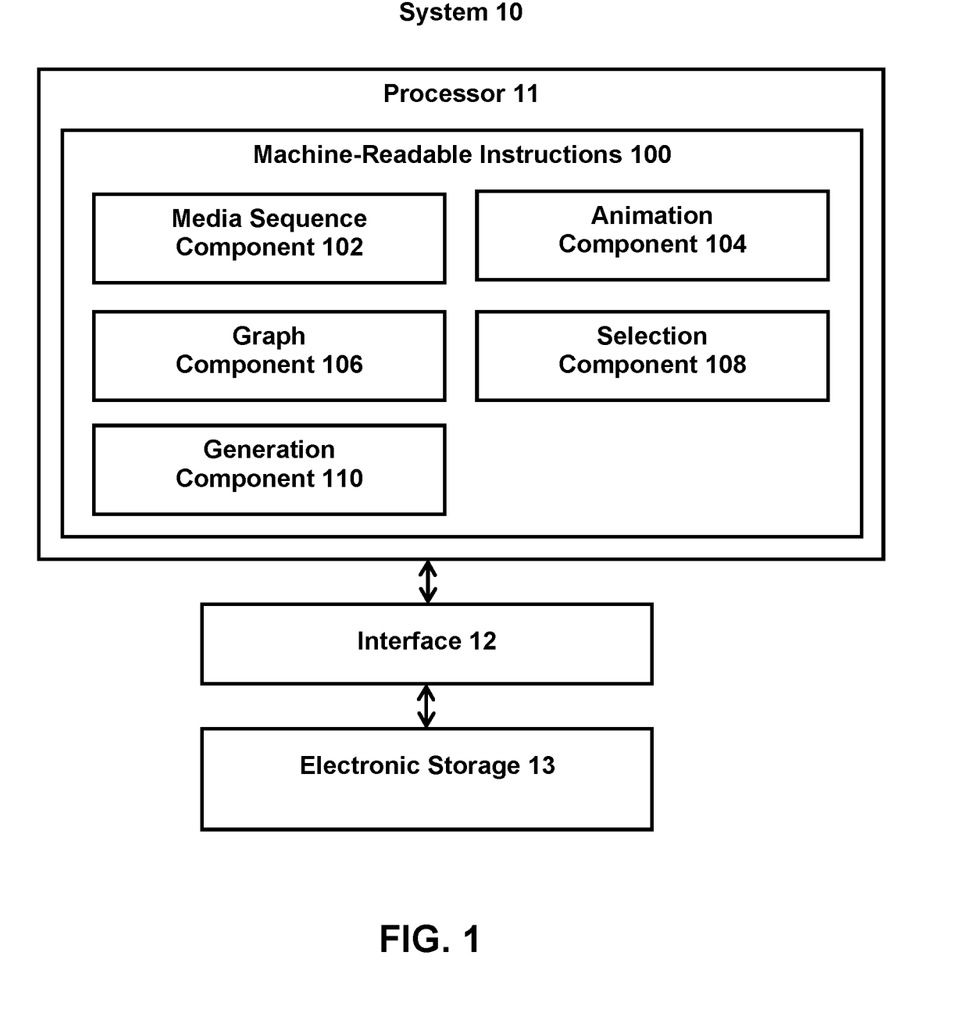
FIG. 1 illustrates a system that selects media animations.

FIG. 1 illustrates a system 10 that selects media animations. The system 10 may include one or more of a processor 11, an interface 12 (e.g., bus, wireless interface), an electronic storage 13, and/or other components. Identification of a sequence of media items included in a media sequence may be obtained by the processor 11. Animations that are available for individual ones of the media items included in the media sequence may be determined by the processor 11. A graph of the animations that are available for the individual ones of the media items included in the media sequence may be generated by the processor 11. The graph may include a node for individual ones of the animations that are available for the individual ones of the media items included in the media sequence. Animations to be used for the media sequence may be selected by the processor 11 via selection of a path through the graph. The media sequence may be generated by the processor 11 using the selected animations.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to media items, information relating to sequences of media items, information relating to animations, information relating to availability of animations, information relating to graphs, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate selecting media animations. The machine-readable instructions 100 may include one or more computer program components. The machine-readable instructions 100 may include one or more of a media sequence component 102, an animation component 104, a graph component 106, a selection component 108, a generation component 110, and/or other computer program components.

The media sequence component 102 may be configured to obtain identification of a sequence of media items included in a media sequence. Identification of a sequence of media items included in a media sequence may refer an act or a process of identifying the sequence of media items included in the media sequence. Identification of a sequence of media items included in a media sequence may refer to information on identity of media items included in the media sequence, information on the order in which the media items are included in the media sequence (e.g., order in which the media items appear in a playback of the media sequence), and/or other identification of the sequence of media items included in the media sequence.

Obtaining identification of a sequence of media items may include one or more of accessing, acquiring, analyzing, determining, examining, generating, identifying, loading, locating, opening, receiving, retrieving, reviewing, selecting, storing, and/or otherwise obtaining the identification of the sequence of media items. In some implementations, the media sequence component 102 may obtain identification of a sequence of media items included in a media sequence based on analysis of the media sequence. For example, the media sequence component 102 may analyze the media sequence, metadata of the media sequence, and/or other information relating to the media sequence to determine the identity of media items included in the media sequence and/or to determine order in which the media items are included in the media sequence. In some implementations, the media sequence component 102 may obtain identification of a sequence of media items included in a media sequence based user input and/or other information. For example, the user input may identify media items included in the media sequence and/or the order in which the media items are included in the media sequence.

A media item may refer to an item that may be visually consumed. A media item may or may not include an audio component. A media item may refer to a multimedia item. For example, a media item may include an image, a video, and/or other media item. A media sequence may refer to a particular order in which media items are arranged/follow each other. That is, a media sequence may include (define) a sequence (a particular arrangement/order) of media items. A media sequence may be generated to provide a view of the media items included in the media sequence. For example, a media sequence may refer to an arrangement/order of media items in a media summary. For example, a media sequence may be generated to include a particular arrangement of one or more images, one or more videos, and/or other media items for playback. For instance, a media sequence may be generated as a video that includes one or more images, one or more videos, and/or other media items in a particular sequence.

Figure 3:
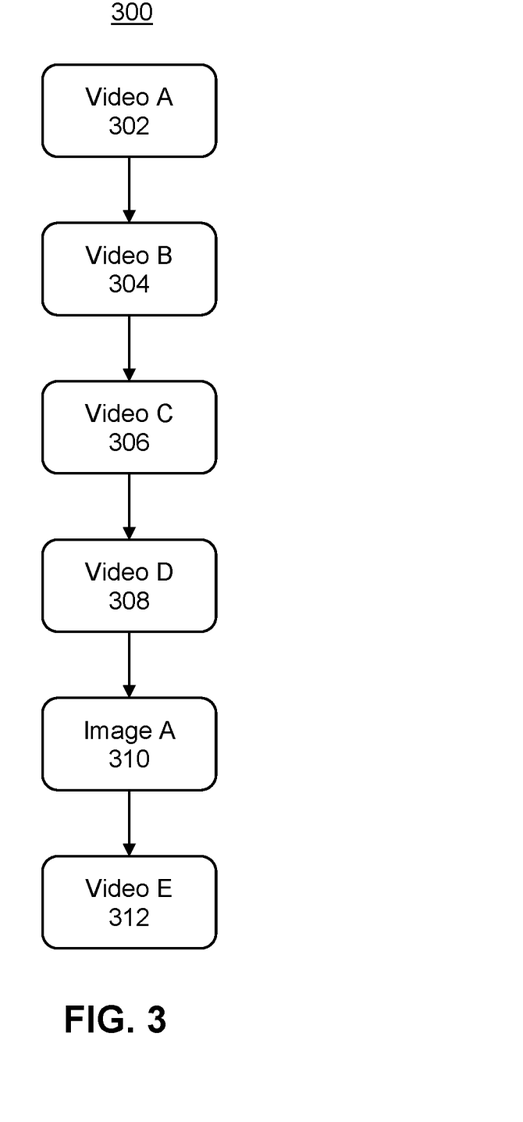
FIG. 3 illustrates an example media sequence.

FIG. 3 illustrates an example media sequence 300. The media sequence 300 may include (define) a particular order of five videos (e.g., five video clips) and an image (e.g., a still image, a video frame). For instance, as shown in FIG. 3, the media sequence may include, in order, a video A 302, a video B 304, a video C 306, a video D 308, an image A 310, and a video E 312. Other sequences of media items are contemplated.

The animation component 104 may be configured to determine animations that are available for individual ones of the media items included in the media sequence. An animation may refer to an effect that may be applied to one or more media items. An animation may change one or more characteristics of the media item to which it is applied. For example, an animation may include one or more visual effects that change one or more visual characteristics of the media item, one or more audio effects that change one or more audio characteristics of the media item, and/or other effects that change other characteristics of the media items. An animation may change one or more characteristics of a media item by altering existing characteristics of the media item, adding new characteristics into the media item, and/or removing existing characteristics of the media item. For example, an animation may define one or more particular types of change to the visual content included in the media item (e.g., change color, change brightness, change sharpness, add shakiness, add text, simulate glitch. Other types of animations are contemplated.

An animation that is available for a media item may refer to an animation that is able to be used on/applied to the media item. An animation that is available for a media item may refer to an animation that may be chosen for use on/application to the media item. The animation component 104 may determine, for individual media items in the media sequence, which animation(s) are available to be used on/applied to the media item.

In some implementations, the animations that are available for individual media items in the media sequence may be determined based on the type of the individual media items and/or other information. A type of a media item may refer to a category of the media item. Different types of media item may include different types of content. For example, different types of media items may include images, videos, and/or other media item types. Different sets of animations may be available for different types of media items. For example, one set of animations may be available for images and a different set of animations may be available for videos. The set of animations available for images may or may not include any overlaps with the set of animations available for videos. For example, one or more of the animations available for images may also be available for videos, and vice versa. As another example, none of the animations available for images may not be available for videos, and vice versa.

The graph component 106 may be configured to generate a graph of the animations that are available for the individual media items included in the media sequence. A graph of animation may refer to a diagram that represents the available animations using nodes. The graph may include a node for individual animations that are available for individual media items included in the media sequence. The graph may include a node for individual media items included in the media sequence. For example, the graph may include a default node for individual media items included in the media sequence. The default node may represent no animation, one or more general animations, and/or other animation. For example, selection of the default node in a path through the graph may result in no animation being applied to the corresponding media item. As another example, selection of the default node in a path through the graph may result in one or more general animations being applied to the corresponding media item. A general animation may refer to an animation that may be applied to any media item. A general animation may refer to an animation that may be applied to a media item regardless of the type of the media item. A general animation may refer to an animation that may be applied to a media item without any constraints. Inclusion of a default node for individual media items may ensure that the graph is not broken (e.g., have holes) when nodes and/or edges are removed because of constraints.

Edges of the graph may represent available succession between animations. For example, an edge connecting two nodes of the graph may represent/indicate that use of the animation represented by the first node may be followed by use of the animation represented by the second node. No edges connecting two nodes of the graph may represent/indicate that use of the animation represented by the first node may not be followed by use of the animation represented by the second node.

In some implementations, the graph of the animations that are available for the individual media items included in the media sequence may be generated based on one or more sets of constraints and/or other information. A set of constraints may include one or more constraints. A constraint may refer to a limitation or a restriction in how the graph is generated. A constraint may refer to a limitation or a restriction in structure of the graph. A constraint may refer to a limitation or a restriction of whether a node and/or an edge may be placed at a particular location within the graph. Use of the constraints may allow for targeted placement of nodes and/or edges in the graph. Use of the constraints may allow for removal of nodes and/or edges in the graph. The constraints may be used to remove undesirable/bad sequence of animations for the media items in the media sequence. After the graph has been generated/modified by taking into account all of the constraints, every path in the graph may be an acceptable/viable sequence of animations to be applied to the media items in the media sequence.

In some implementations, the graph may be initially generated as a fully connected graph, and the constraints may be used to remove one or more nodes and/or one or more edges from the graph to remove undesirable/bad sequence of animations for the media items in the media sequence. In some implementations, the constraints may be taken into account when generating the graph so that nodes/edges that would result in undesirable/bad sequence of animations are not included in the graph. In some implementations, one or more constraints may be applied in initial generation of the graph, while one or more other constraints may be applied to modify the graph via removal of nodes/edges.

In some implementations, the set of constraints may include a media compatibility constraint. A media compatibility constraint may refer to a constraint defines compatibility (available) of an animation with a media item based on one or more characteristics of the media item. A media compatibility constraint may determine whether an animation is compatible with a media item based on one or more characteristics of the media item and/or other information. A characteristic of a media item may refer to a feature and/or a quality of the media item. A characteristics of a media item may refer a feature and/or a quality of one or more things depicted within the media items, and/or a feature and/or a quality of how one or more things are depicted within the media items. For example, a characteristic of a media item may include one or more of thing depicted within the media items (e.g., classification of thing(s) depicted within the media items, such as person, animal, thing, environment, face, emotion, activity, action, highlight event), sizes of the media items, lengths of the media items, color used in the media items, location in which the media items were captured, shapes/orientations of the media items (e.g., portrait, landscape), resolutions of the media items, framerates of the media items, camera settings used to capture the media items, editing processes used to capture/edit the media items, and/or other characteristic of the media items.

For example, a media compatibility constraint may determine whether an animation is compatible with a media item based on the length of the media items (e.g., an animation is available for a media item having a duration less than/greater than/same as a threshold duration). As another example, a media compatibility constraint may determine whether an animation is compatible with a media item based on intensity (e.g., strength/amount) of noise, music, and/or activity captured within the media items (e.g., an animation is available for a media item having intensity greater than a threshold intensity). As another example, a media compatibility constraint may determine whether an animation is compatible with a media item based on types of edits made to the media items. Other types of media compatibility constraint are contemplated.

In some implementations, the set of constraints may include a succession constraint. A succession constraint may refer to a constraint that limits succession of animations. A succession constraints may refer to a constraint that limit one or more particular animations from following one or more animations. A succession constraint may define one or more forbidden sequences of animations. A forbidden sequence of animations may refer to a sequence of animations that are not allowed to exist. A forbidden sequence of animations may refer to a linked chain of nodes that are not allowed to exist within the graph. For example, a succession constraint may prohibit one animation from being followed by another animation (e.g., animation A should not be followed by animation B).

In some implementations, a succession constraint may define one or more preferred sequences of animations. A preferred sequence of animations may refer to a sequence of animations that are more preferred than other sequence of animations. A preferred sequence of animations may refer to a linked chain of nodes that are more desirable than other linked chains of nodes. In some implementations, the preferred sequence of animations may be used to calculate scores and/or weights of the nodes and/or to calculate scores and/or weights of edges (e.g., add weight to edges between preferred sequences).

In some implementations, the set of constraints may include a repetition constraint. A repetition constraint may refer to a constraint that limits repetition of an animation in a media sequence. A repetition constraint may define a maximum number of times a given animation is allowed to repeat in a media sequence. A petition constraint may define a maximum number of time a given animation is allowed to repeat sequentially in a media sequence. A petition constraint may define a maximum number of time a given animation is allowed repeat (appear) in a media sequence. For example, a repetition constraint may prohibit a particular animation from being repeated in a chain more than a set number of times.

In some implementations, the set of constraints may include a distance constraint. A distance constraint may refer to a constraint that limits how close an animation may be repeated within the media sequence. A distance constraint may define a minimum distance between repetitions of a particular animation. A distance constraint may prohibit an animation from being repeated in the media sequence with a particular proximity (e.g., not allow the same animation to be used within a certain number of media items).

In some implementations, the set of constraints may include a target number constraint. A target number constraint may refer to a constraint that limits how many times an animation appears within the media sequence. The target number constraint may define a target number of times an animation is to be repeated. A target number of times an animation is to be repeated may refer to a preferred number of times the animation is to be repeated in the media sequence. A target number of times an animation is to be repeated may be set based on a direct value and/or based on a ratio. For example, a target number of times an animation is to be repeated may include a particular number of repetitions (e.g., 3) and/or a particular ratio/percentage of the animations used on the media sequence (e.g., 30% of animations be should a particular type of animation). Other constraints are contemplated.

In some implementations, scores and/or weights may be calculated for individual nodes and/or individual edges in the graph. The scores and/or weights may reflect the desirability of selecting the represented/corresponding animation for application to the represented/corresponding media item. For example, two nodes for a media items may have different values of score/weight, and the higher value of the score/weight for a node may indicate that the animation corresponding to/represented by the node is more desirable for selection/more likely to be selected for use in generating the media sequence than the animation corresponding to/represented by the node with the lower value of the score/weight.

In some implementations, scores and/or weights may be calculated for individual nodes in the graph based on the scores and/or weights assigned to the corresponding/represented animations. For example, different animations may have different values of scores and/or weights. In some implementations, scores and/or weights may be calculated for individual nodes in the graph based on surrounding nodes, preceding nodes, and/or subsequent nodes. For example, the score/weight value of a particular node may be dependent on weight of nodes that are below the particular nodes. In some implementations, scores and/or weights may be calculated for individual nodes in the graph based music accompanying the media sequence (e.g., background music for the media sequence). For instance, scores and/or weights may be calculated for individual nodes in the graph based on intensity of the music. For instance, scores and/or weights may be calculated for individual nodes in the graph based on one or more characteristics of the media items. Other calculation of scores and/lor weights is contemplated.

In some implementation, a low (e.g., 0) or a negative score/weight may be assigned to default nodes/nodes representing default animations. Such assignment of score/weight may ensure that default nodes are not selected when non-default nodes are available for selection. Such assignment of score/weight may ensure that defaults nodes are selected only when no other nodes are available.

Figure 4A:
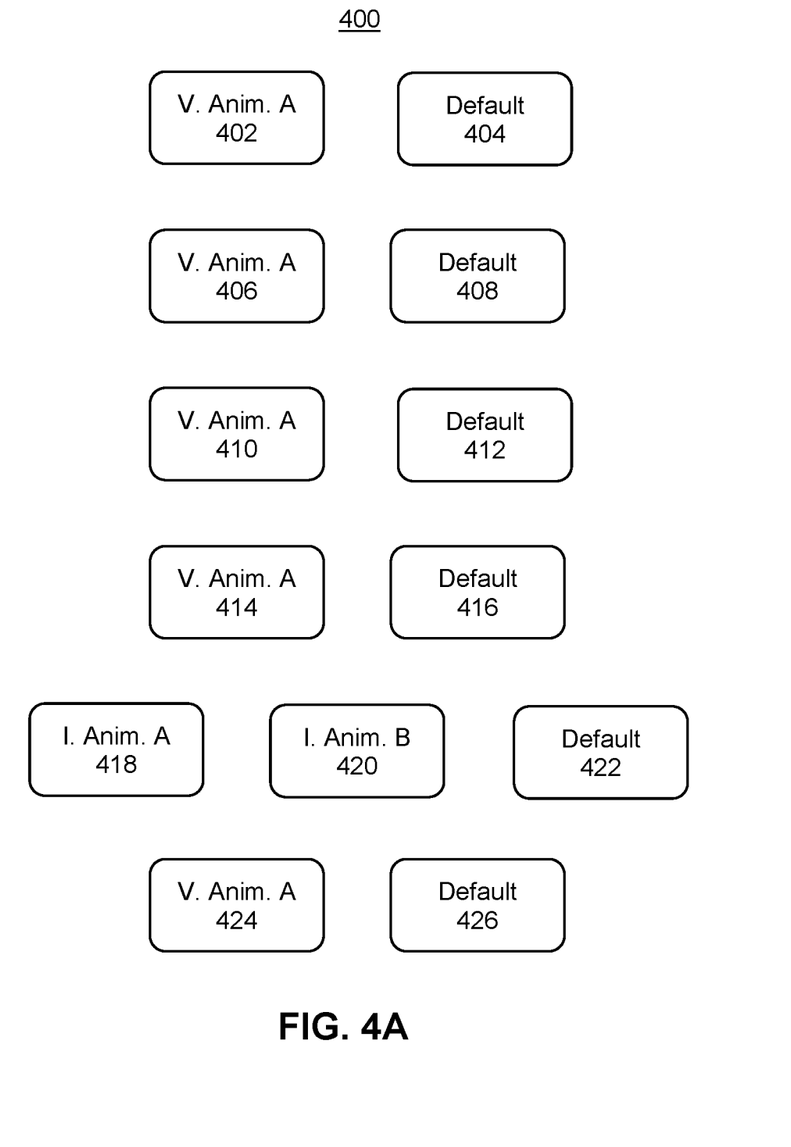
FIGS. 4A, 4B, 4C, 4D, and 4E illustrate example graph of animations.

FIGS. 4A, 4B, 4C, 4D, and 4E illustrate an example graph of animations 400. The graph 400 may be generated for the media sequence 300. As shown in FIG. 4A, the graph 400 may include the following nodes to represent animations that are available for different media items included in the media sequence 300: for the video A 302, a video animation A node 402 to represent a video animation A and a default node 404 to represent a default animation; for the video B 304, a video animation A node 406 to represent the video animation A and a default node 408 to represent the default animation; for the video C 306, a video animation A node 410 to represent the video animation A and a default node 412 to represent the default animation; for the video D 308, a video animation A node 414 to represent the video animation A and a default node 416 to represent the default animation; for the image A 310, an image animation A node 418 to represent an image animation A, an image animation B node 420 to represent an image animation B, and a default node 422 to represent the default animation; and for the video E 312, a video animation A node 424 to represent the video animation A and a default node 426 to represent the default animation.

Figure 4B:
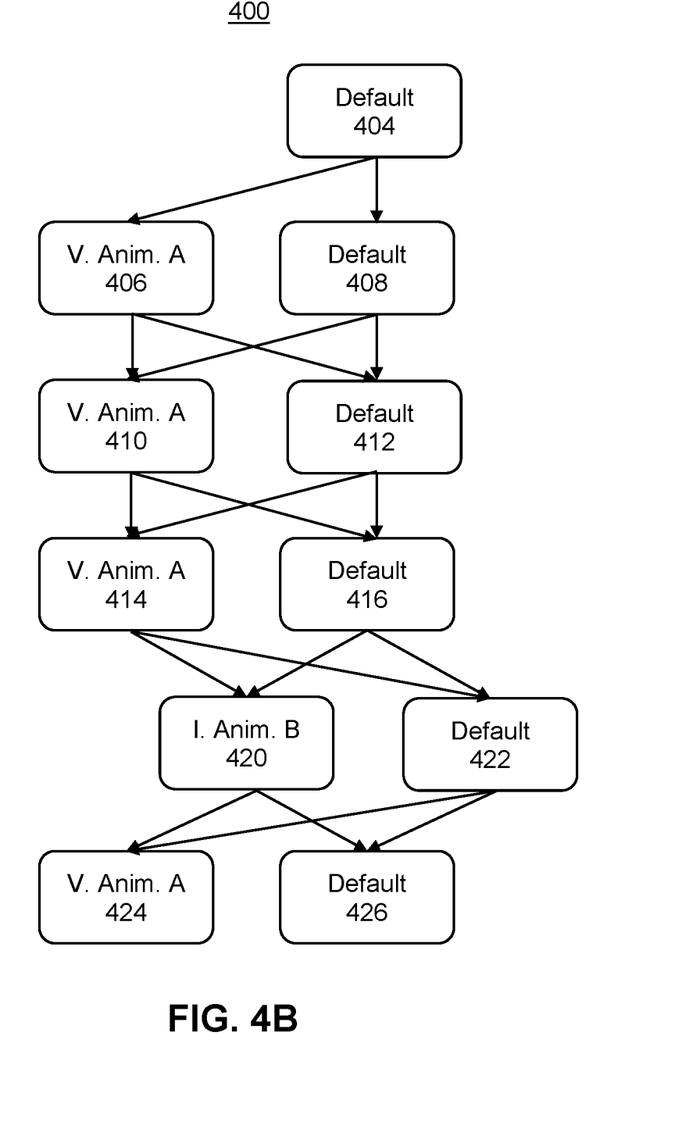

Next, as shown in FIG. 4B, edges may be drawn between nodes of the graph 400. Edges may be drawn between individual nodes of adjacent layers (e.g., between nodes of first layer and second layer, between nodes of second layer and third layer, etc.). In some implementations, one or more edges may not be drawn responsive to one or more constraints. For example, an edge may not be drawn between two nodes responsive to a constraint preventing succession between the two corresponding animations (e.g., a constraint preventing one animation from following another animation in the media sequence).

In FIG. 4B, two nodes of the graph 400 may be removed based on one or more constraints. The video animation A node 402 and the image animation A node 418 may be removed from the graph 400 based on one or more constraints. For example, the video animation A node 402 may be removed from the graph 400 based on the media compatibility constraint. The video animation A (represented by the video animation A node 402) may not be compatible with the video A 302 under the media compatibility constraint. For instance, the duration of the video A 302 may be too short or too long for application of the video animation A, and, as a result, the video animation A node 402 may be removed from the graph 400 so that the video animation A cannot be applied to the video A 302. As another example, the image animation A node 418 may be removed from the graph 400 based on the target number constraint. The target number of times the image animation A may appear within the media sequence may be zero, and, as a result, the image animation A node 418 may be removed from the graph 400 so that the image animation A is not applied to any media item within the media sequence.

Figure 4C:
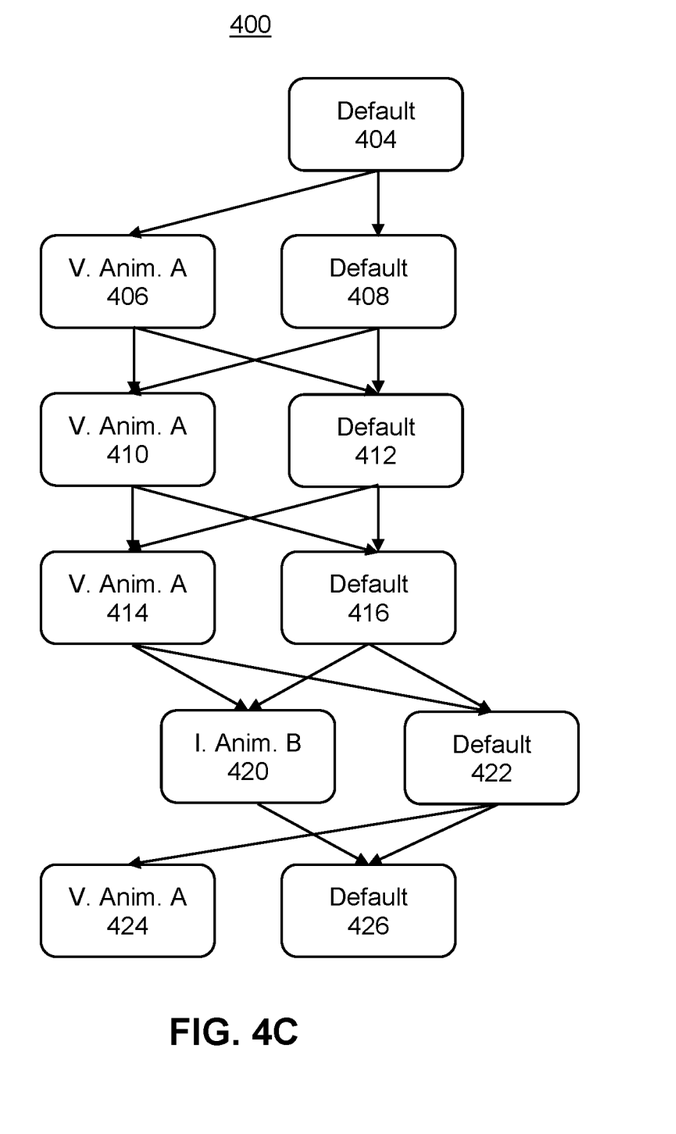

In FIG. 4C, an edge of the graph 400 may be removed based on one or more constraints. The edge between the image animation B node 420 and the video animation A node 424 may be removed from the graph 400 based on one or more constraints. For example, the edge between the image animation B node 420 and the video animation A node 424 may be removed from the graph based on the succession constraint. For instance, the video animation A may not follow the image animation B under the succession constraint. As a result, the edge between the edge between the image animation B node 420 and the video animation A node 424 may be removed from the graph 400 so that the image animation B cannot follow the video animation A.

Figure 4D:
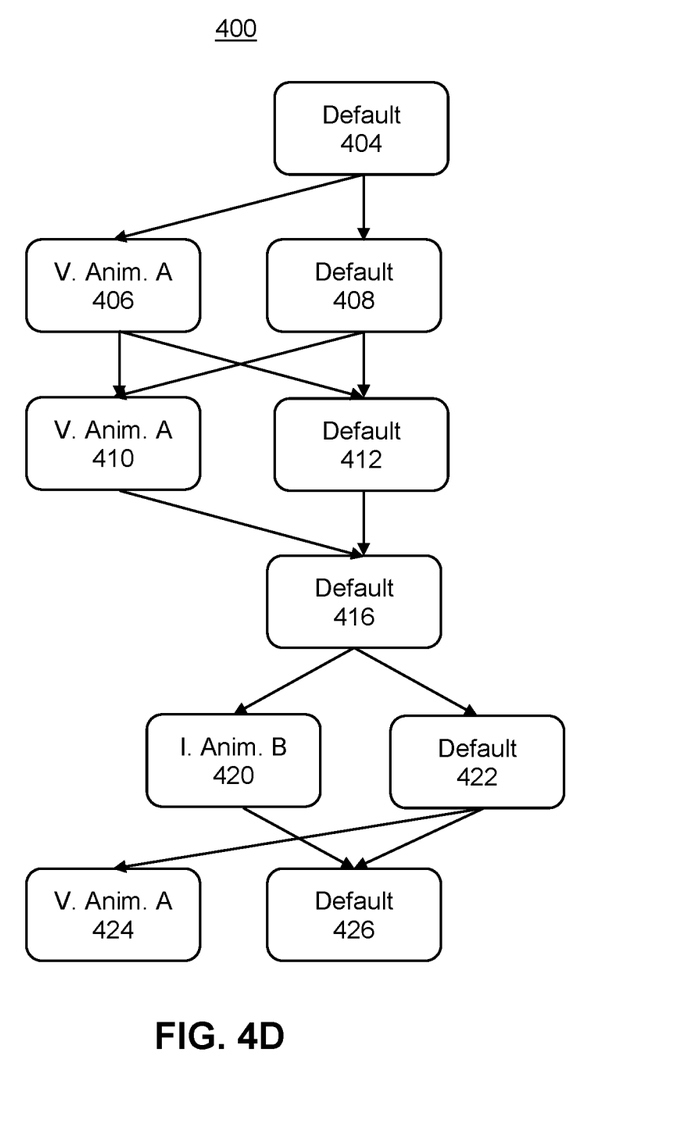

In FIG. 4D, a node of the graph 400 may be removed based on one or more constraints. The video animation A node 414 may be removed from the graph 400 based on one or more constraints. For example, the video animation A node 414 may be removed from the graph 400 based on the repetition constraint. For instance, the repetition constraint may limit successive repetition of the video animation A to two times. The graph 400 may include three successive repetition of the video animation A (represented by the video animation A node 406, the video animation A node 410, the video animation A node 414). As a result, the video animation A node 414 may be removed from the graph 400 based on the repetition constraint so that successive repetition of the Video animation A is limited to two times.

In some implementations, the animation/node to be removed based on one or more constraints may be determined based on an order of candidate animations/nodes to be removed. A candidate animation/node may refer to an animation/node that may be removed for violating or more constraints. For example, in the above example or repetition constraint, the video animation A node 406, the video animation A node 410, or the video animation A node 414 may be removed to repetition more than two successive repetition of the video animation A. The video animation A node 406, the video animation A node 410, or the video animation A node 414 may be candidate nodes for potential removal. The node to be removed may be selected based on the ordering of the nodes. For example, the first, the middle, or the last node may be removed to satisfy the repetition constraint.

In some implementations, the animation/node to be removed based on one or more constraints may be determined based on the scores and/or weights of the nodes. For example, in the above example with three candidate nodes for potential removal, a node with the lowest (or highest) score and/or weight may be selected for removal. That is, the node removal may preserve within the graph the nodes with the highest/higher (or lowest/lower) scores and/or weights.

In some implementations, the animation/node to be removed based on one or more constraints may be determined based on the scores and/or weights of the edges. For example, in the above example with three candidate nodes for potential removal, a node that is connected via lowest (or highest) score and/or weight edges may be selected for removal. That is, the node removal may preserve within the graph the nodes that are connected with edges having highest/higher (or lowest/lower) scores and/or weights. Other reduction of graph and other removal of nodes and edges using constraints are contemplated.

The selection component 108 may be configured to select animations to be used for the media sequence. Selecting animations to be used for the media sequence may include ascertaining, choosing, determining, establishing, finding, identifying, obtaining, setting, and/or otherwise selecting the animations to be used for the media sequence. Selecting animations to be used for the media sequence may include selecting animations to be used for individual media items included in the media sequence.

The animations to be used for the media sequence may be selected based on user selection, analysis of the graph, and/or other information. User selection may refer to user input that identifies animations to be used for the media sequence. Analysis of the graph may refer to examination, evaluation, processing, studying, and/or other analysis of one or more features/characteristics of the graph. For example, analysis of the graph may take into account number of nodes and/or edges within the graph, scores and/or weights of nodes within the graph, scores and/or weights of edges within the graph, preferred sequence of animations, and/or other features/characteristics of the graph. The animations to be used for the media sequence may be selected via selection of a path through the graph. A path through the graph may refer to a course or a way that travels through the graph. A path may move from a node to a node within the graph via edges between the nodes. A path through the graph may be selected based on user selection, analysis of the graph, and/or other information.

For example, the graph of animations may be presented to a user within a user interface, and the user may select a path through the graph to select which animations will be applied to the media items included in the media sequence. As another example, the list of animations that are available for individual media items (according to the graph) may be presented for user selection.

As another example, the path through the graph may be automatically selected based on analysis of the graph. For example, for individual layers in the graph, the path may travel through nodes/edges with the highest (lowest) score and/or weight. As another example, the path through the graph may be selected to maximize/minimize the total score and/or weight of the path. The score and/or weight of the path may be determined based on the score and/or weight of the nodes and/or edges through which the path travels.

In some implementations, one or more of the constraints may be applied in the selection of the path. For example, a succession constraint that defines a preferred sequence of animations may be applied in the selection of the path to encourage the path to include nodes that will result in the preferred sequence of animations. As another example, a repetition constraint may be applied in the selection of the path so that as the path is drawn to include nodes, the maximum number of animations is not breached. As another example, a target number constraint may be applied in the selection of the path so that as the path is drawn to include nodes, the target number of animations is reached.

Figure 4E:
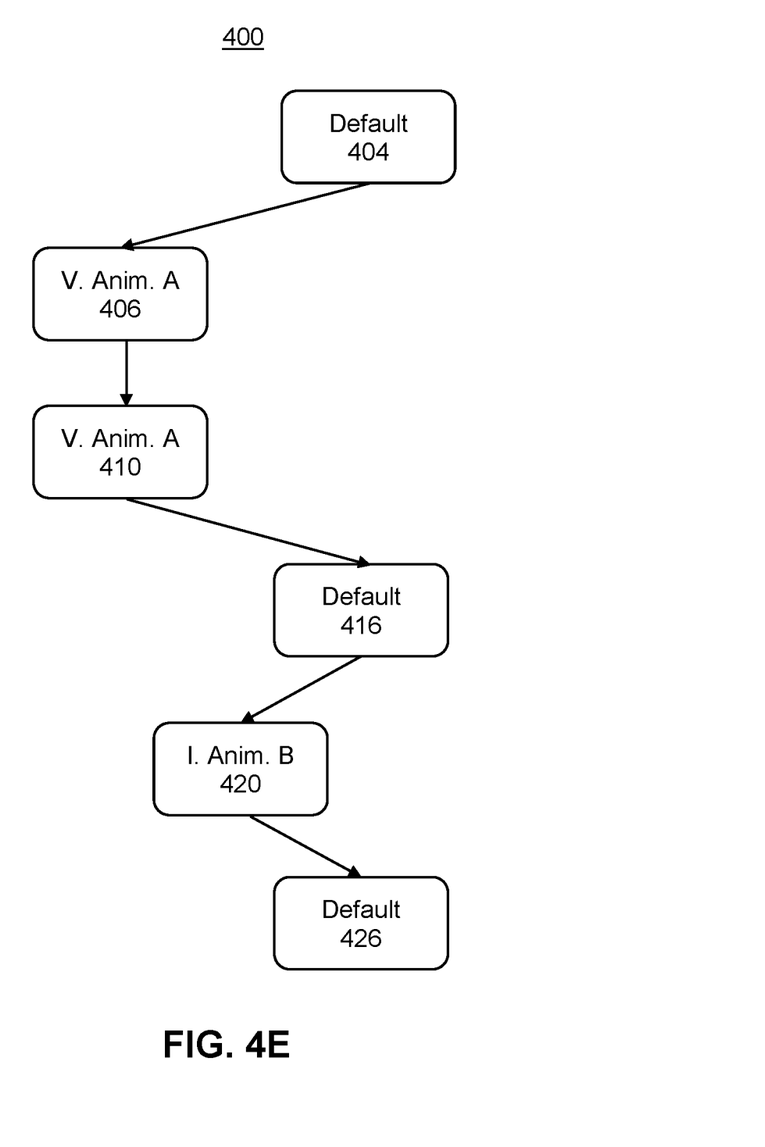

An example path selected through the graph 400 is shown in FIG. 4E. As shown in FIG. 4E, the path may include the default node 404, the video animation A node 406, the video animation A node 410, the default node 416, the image animation B node 420, and a default node 426. Selection of other paths is contemplated.

Figure 5:
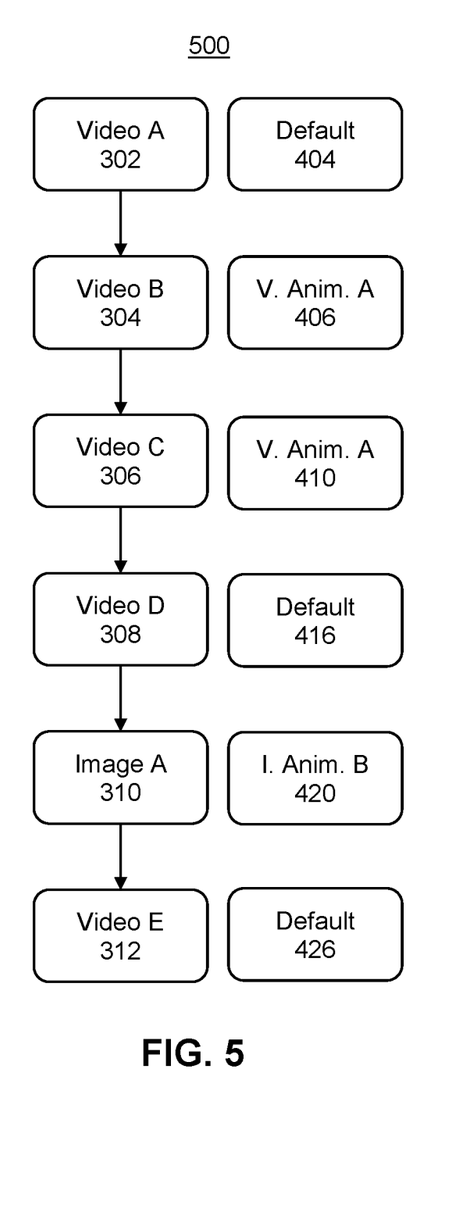
FIG. 5 illustrates example animations selected for media items in a media sequence.

FIG. 5 illustrates example animations selected for media items in a media sequence. As shown in FIG. 5, the default animation may be applied to the video A 302, the video animation A may be applied to the video B 304 and the video C 306, a default animation may be applied to the video D 308, the image animation B may be applied to the image A 310, and a default animation may be applied to the video E 312. In some implementations, the same default animation may be applied to the video A 302, the video D 308, and the video E 312. In some implementations, different default animations may be applied to the video A 302, the video D 308, and the video E 312. In some implementations, the same animation may be applied to different media items using the same setting. For example, same setting (e.g., same strength/intensity of effect) of the video animation A may be used for application to the video B 304 and the video C 306. In some implementations, the same animation may be applied to different media items using different settings. For example, different settings (e.g., different strength/intensity of effect) of the video animation A may be used for application to the video B 304 and the video C 306.

Figure 6:
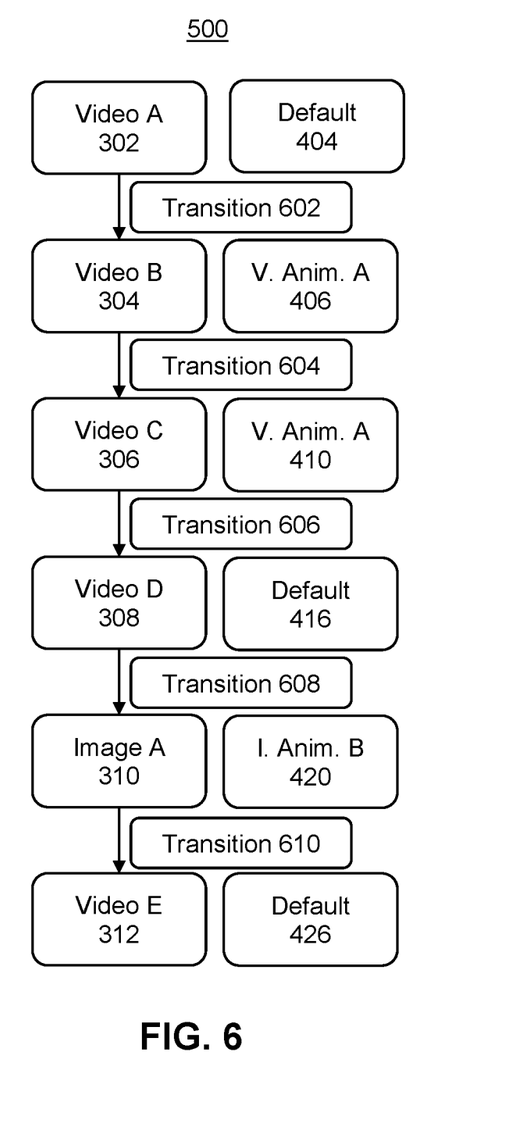
FIG. 6 illustrates example transitions selected for a media sequence.

In some implementations, one or more transitions may be applied to the media sequence. A transition may refer to an animation that moves from the media sequence from one media item to another media item. Examples of transitions include mix, dissolve, crossfade, fade, wipe, rotation, shake, and/or other transitions. The transitions to be applied to the media sequence may be selected based on user selection, analysis of the graph, and/or other information. FIG. 6 illustrates example transitions selected for a media sequence. As shown in FIG. 6, a transition 602 may be applied between the video A 302 and the video B 304, a transition 604 may be applied between the video B 304 and the video C 306, a transition 606 may be applied between the video C and the Video D 308, a transition 608 may be applied between the video D 308 and the image A 301, and a transition 610 may be applied between the image A 310 and the video E 312. While FIG. 6 shows a transition between each media items, this is merely as an example and is not meant to be limiting. In some implementations, a transition may not be applied between every media items.

In some implementations, transitions may have preferred placements based on characteristics/types of the media items, and/or characteristics/types of the animations used with the media items. For example, one type of transition may be preferred for placement between two images while another type of transition may be preferred for placement between an image and a video.

Not including nodes and edges for selection of transition in the graph may allow the graph to remain small and light weight. Not including nodes and edges for selection of transition in the graph may allow the graph to be processed for selection of animation at low cost (e.g., low processing power/time requirement).

The generation component 110 may be configured to generate the media sequence. The media sequence may be generated using the selected animations. The selected animations for the media items included in the media sequence may be applied to the media items in generation of the media sequence. Generation of the media sequence may include generation of the media items for current presentation or later presentation. For example, the media sequence may be generated for presentation on one or more display. The media sequence may be generated as one or more files, and the file(s) may be stored for later retrieval/playback back.

Generation of the media sequence may include generation of a media file. For example, the media sequence may be generated as an encoded video file. The encoded video file may include the media items in the sequence. The encoded video file may include the media items altered by applying the selected animations. Generation of the media sequence may include generation of instructions for playback of the media file. For example, the media sequence may be generated as instructions identifying the media items to be played, the order in which the media items are to be played, and/or animations to be applied to the media items during playback. Other generation of the media sequence is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
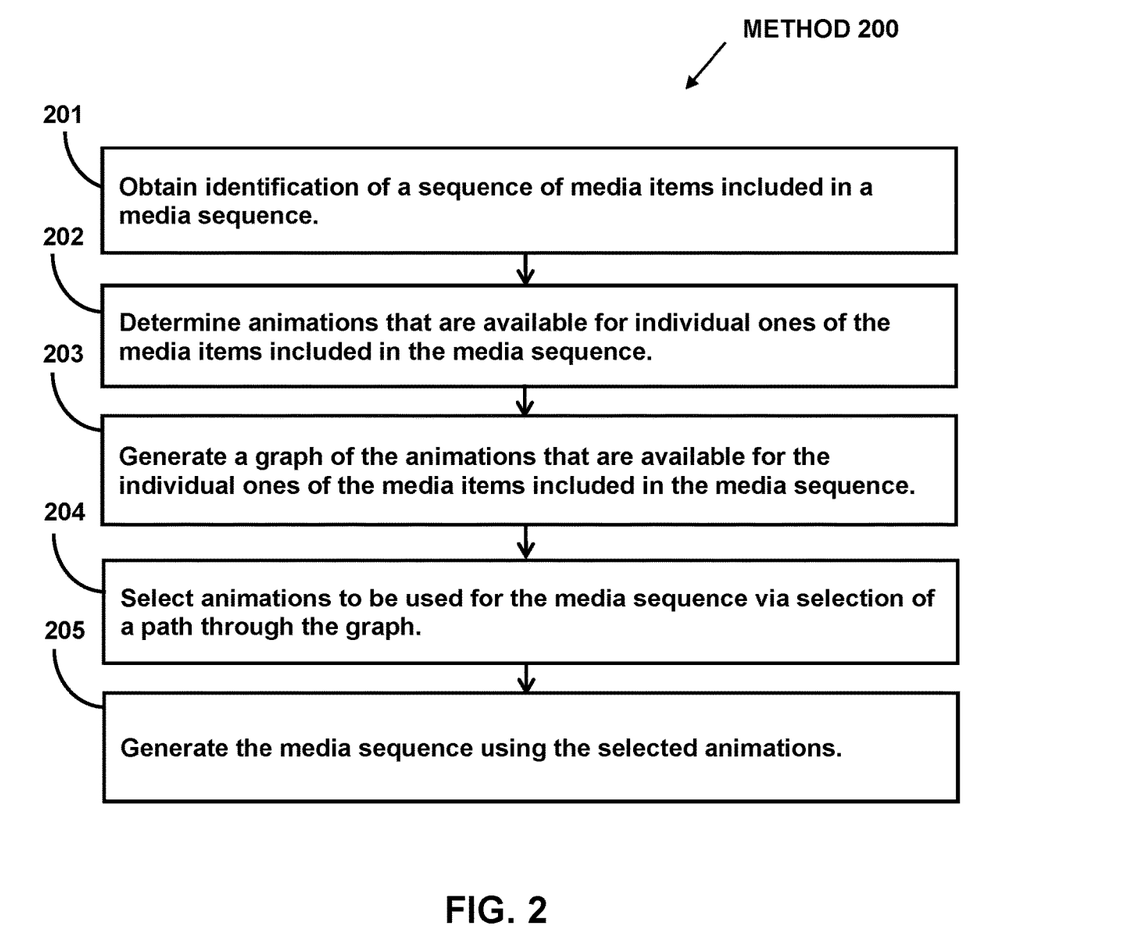
FIG. 2 illustrates a method for selecting media animations.

FIG. 2 illustrates method 200 for selecting media animations. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, identification of a sequence of media items included in a media sequence may be obtained. In some implementations, operation 201 may be performed by a processor component the same as or similar to the media sequence component 102 (Shown in FIG. 1 and described herein).

At operation 202, animations that are available for individual ones of the media items included in the media sequence may be determined. In some implementations, operation 202 may be performed by a processor component the same as or similar to the animation component 104 (Shown in FIG. 1 and described herein).

At operation 203, a graph of the animations that are available for the individual ones of the media items included in the media sequence may be generated. The graph may include a node for individual ones of the animations that are available for the individual ones of the media items included in the media sequence. The topology of the graph (e.g., nodes, edges) may be modified using one or more constraints. In some implementations, operation 203 may be performed by a processor component the same as or similar to the graph component 106 (Shown in FIG. 1 and described herein).

At operation 204, animations to be used for the media sequence may be selected via selection of a path through the graph. In some implementations, operation 204 may be performed by a processor component the same as or similar to the selection component 108 (Shown in FIG. 1 and described herein).

At operation 205, the media sequence may be generated using the selected animations. In some implementations, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for selecting media animations, the system comprising:
one or more physical processors configured by machine-readable instructions to:
obtain identification of a sequence of media items included in a media sequence;

determine animations that are available for individual ones of the media items included in the media sequence;

generate a graph of the animations that are available for the individual ones of the media items included in the media sequence, the graph including a node for individual ones of the animations that are available for the individual ones of the media items included in the media sequence;

select animations to be used for the media sequence via selection of a path through the graph; and generate the media sequence using the selected animations.

2. The system of claim 1, wherein the sequence of media items includes one or more images and/or one or more videos.

3. The system of claim 1, wherein the animations that are available for the individual ones of the media items included in the media sequence are determined, by the one or more physical processors, based on a type of the individual ones of the media items.

4. The system of claim 3, wherein a first set of animations are available for an image and a second set of animations are available for a video, the first set of animations different from the second set animations.

5. The system of claim 1, wherein the graph of the animations that are available for the individual ones of the media items included in the media sequence is generated by the one or more physical processors based on a set of constraints.

6. The system of claim 5, wherein the set of constraints includes a media compatibility constraint, the media compatibility constraint determining whether a given animation is compatible with a given media item based on one or more characteristics of the given media item.

7. The system of claim 5, wherein the set of constraints includes a succession constraint, the succession constraint defining one or more forbidden sequences of animations.

8. The system of claim 5, wherein the set of constraints includes a repetition constraint, the repetition constraint defining a maximum number of times a given animation is allowed to repeat.

9. The system of claim 5, wherein the set of constraints includes a distance constraint, the distance constraint defining a minimum distance between repetitions of a given animation.

10. The system of claim 5, wherein the set of constraints includes a target number constraint, the target number constraint defining a target number of times a given animation is to be repeated.

11. A method for selecting media animations, the method performed by a computing system including one or more processors, the method comprising:

obtaining, by the computing system, identification of a sequence of media items included in a media sequence;

determining, by the computing system, animations that are available for individual ones of the media items included in the media sequence;

generating, by the computing system, a graph of the animations that are available for the individual ones of the media items included in the media sequence, the graph including a node for individual ones of the animations that are available for the individual ones of the media items included in the media sequence;

selecting, by the computing system, animations to be used for the media sequence via selection of a path through the graph; and generating, by the computing system, the media sequence using the selected animations.

12. The method of claim 11, wherein the sequence of media items includes one or more images and/or one or more videos.

13. The method of claim 11, wherein the animations that are available for the individual ones of the media items included in the media sequence are determined based on a type of the individual ones of the media items.

14. The method of claim 13, wherein a first set of animations are available for an image and a second set of animations are available for a video, the first set of animations different from the second set animations.

15. The method of claim 11, wherein the graph of the animations that are available for the individual ones of the media items included in the media sequence is generated based on a set of constraints.

16. The method of claim 15, wherein the set of constraints includes a media compatibility constraint, the media compatibility constraint determining whether a given animation is compatible with a given media item based on one or more characteristics of the given media item.

17. The method of claim 15, wherein the set of constraints includes a succession constraint, the succession constraint defining one or more forbidden sequences of animations.

18. The method of claim 15, wherein the set of constraints includes a repetition constraint, the repetition constraint defining a maximum number of times a given animation is allowed to repeat.

19. The method of claim 15, wherein the set of constraints includes a distance constraint, the distance constraint defining a minimum distance between repetitions of a given animation.

20. The method of claim 15, wherein the set of constraints includes a target number constraint, the target number constraint defining a target number of times a given animation is to be repeated.

* * * * *